United States Patent [19]
Bradbury

[11] Patent Number: 5,613,541
[45] Date of Patent: Mar. 25, 1997

[54] SLIDING SHUTTERS

[75] Inventor: Gordon Bradbury, Middlewich, Great Britain

[73] Assignee: James & Bloom Limited, Great Britain

[21] Appl. No.: 367,278

[22] PCT Filed: Jul. 13, 1993

[86] PCT No.: PCT/GB93/01462

§ 371 Date: Jan. 11, 1995

§ 102(e) Date: Jan. 11, 1995

[87] PCT Pub. No.: WO94/01298

PCT Pub. Date: Jan. 20, 1994

[30] Foreign Application Priority Data

Jul. 14, 1992 [GB] United Kingdom ............... 9214886

[51] Int. Cl.$^6$ ........................................ E06B 3/48
[52] U.S. Cl. ............................ 160/231.2; 160/232
[58] Field of Search ..................... 160/201, 231.2, 160/229.1, 231.1, 232, 40, 235, 206, 207; 16/225, 355, DIG. 13

[56] References Cited

U.S. PATENT DOCUMENTS

| | | | |
|---|---|---|---|
| 2,311,470 | 2/1943 | Ritter | 160/201 |
| 2,831,537 | 4/1958 | Ritter | 160/201 |
| 3,148,724 | 9/1964 | Chieger et al. | 160/201 |
| 3,297,077 | 1/1967 | Garbus | 160/231.2 |
| 3,302,690 | 2/1967 | Hurd | 160/201 |
| 3,403,720 | 10/1968 | Ahleen | 160/231.2 |
| 3,527,283 | 9/1970 | Butler et al. | 160/231.2 |
| 3,894,571 | 7/1975 | Hinchliff | 160/201 |
| 4,762,020 | 8/1988 | Schmidberger et al. | 160/231.2 |
| 4,793,397 | 12/1988 | Whiteman | 160/201 |
| 4,995,441 | 2/1991 | Leist et al. | 160/231.2 |
| 5,133,108 | 7/1992 | Esnault | 160/231.2 |
| 5,148,850 | 9/1992 | Urbanick | 160/201 |

*Primary Examiner*—David M. Purol
*Attorney, Agent, or Firm*—Fitch, Even, Tabin & Flannery

[57] ABSTRACT

The invention relates to a sliding or roller shutter or door which consists of a plurality of generally similar laths or planks hinged together by elastomeric members attached to adjacent edges of the laths or planks. Preferably, the edges of the laths or planks are formed with longitudinally extending keyhole shaped shots, and the elastomeric hinge members are formed with opposite enlarged portions received in the slots in the laths or planks.

7 Claims, 2 Drawing Sheets

SLIDING SHUTTERS

BACKGROUND OF THE INVENTION

1. Technical Field

The invention relates to sliding shutters, particularly, but not exclusively, for use as doors for the load carrying compartments of commercial motor vehicles.

2. Background Art

It is well known to provide a roller or 'up and over' shutter or door for closing a commercial vehicle body such as a van or truck body in the form of a vertically sliding member consisting of a series of planks or lathes made, for example, of aluminium or plywood which are hinged together and which are guided at their ends in suitable tracks in the vehicle body. Similar shutters are used for closing commercial premises and to improve the security of domestic premises.

It is an object of the invention to provide an improved sliding or roller shutter or door.

SUMMARY OF THE INVENTION

According to the invention a sliding or roller shutter or door consists of a plurality of generally similar lathes or planks hinged together by elastomeric members attached to adjacent edges of the lathes or planks. Preferably the edges of the lathes or planks are formed with longitudinally extending key-hole shape slots, and the elastomeric hinge members are formed with opposite enlarged portions received in the slots in the lathes or planks. The elastomeric member will preferably be of constant cross-section and may be such that the enlarged portions are joined by a web. The elastomeric members may be dumb-bell shaped in cross-section. Preferably the elastomeric hinges will be attached along the full lengths of the lathes or planks.

The lathes or planks are preferably made from a high impact plastics such as UPVC (polyvinyl chloride). Suitably the lathes or planks may be made by an extrusion process. If desired the lathes or planks may be twin-walled and the resulting cavity or cavities may be filled, if desired, with a thermally insulating material.

Where the elastomeric hinges extend along the full length of the lathes or planks, an air and watertight door or shutter can be produced.

BRIEF DESCRIPTION OF THE DRAWINGS

The invention is diagrammatically illustrated, by way of example, in the accompanying drawings, in which.

DESCRIPTION

Figure 1:
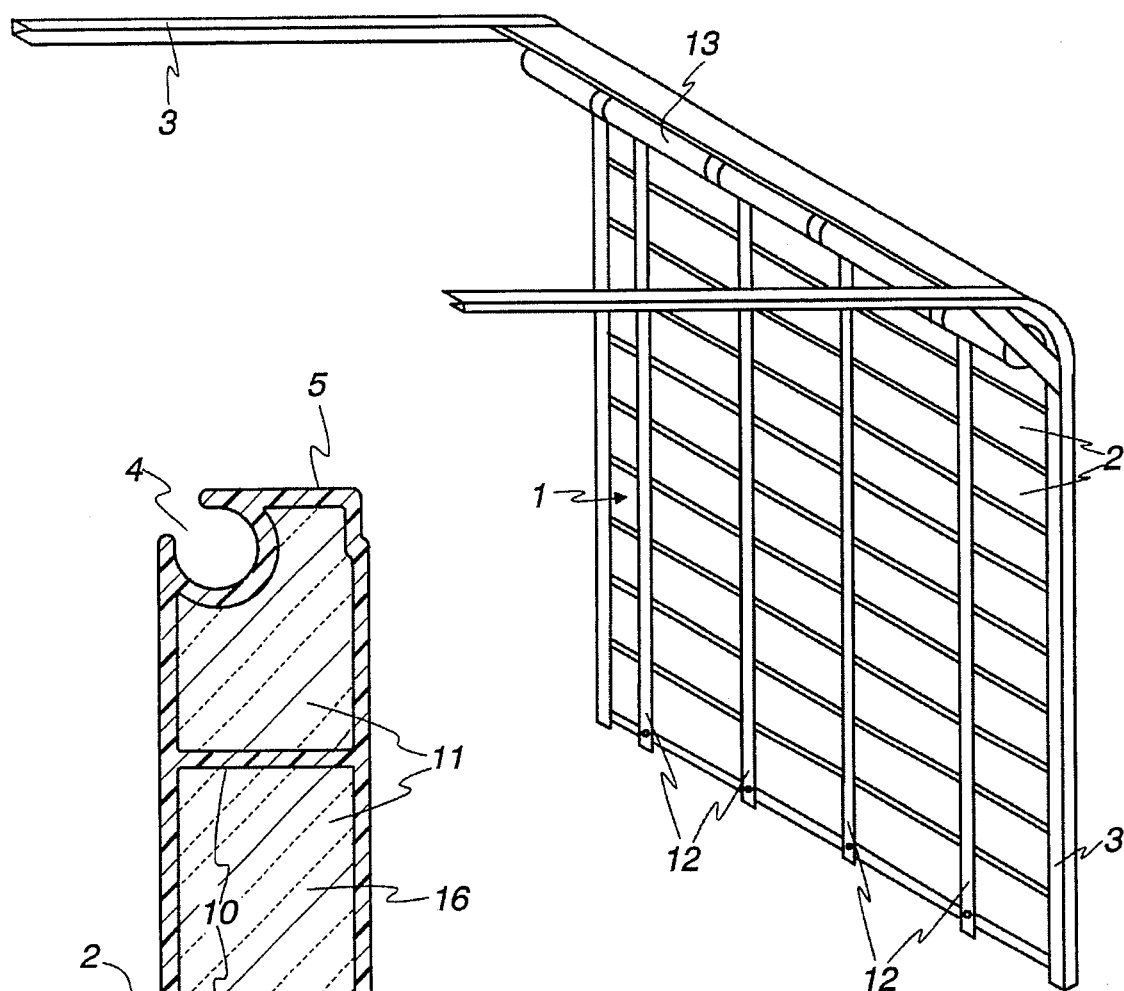
FIG. 1 is a perspective view of a sliding or roller shutter door for a commercial motor vehicle body.

In the drawings, a sliding or roller shutter door for a commercial motor vehicle body is shown which is conventional in its general arrangement and consisting of a sliding shutter 1 formed by a series of generally similar lathes or planks 2 hinged together along their mutually abutting edges 5 and mounted at their respective ends, which form opposite edges of the shutter, in a parallel pair of L-shaped tracks 3, whereby the shutter is movable along the tracks to open and close the door. The tracks 3, which are generally U-shaped in cross section, are mounted in a commercial motor vehicle body (not shown) so that the vertical limbs of the tracks 3 extend down both sides of the door opening and so that the horizontal limbs of the tracks 3 extend along the vehicle body near to its roof. Conventionally the planks or lathes 2 have been made of plywood joined together with metal hinges or have been made from aluminium extrusions formed integrally at their edges with mating hinge portions.

Figure 4:
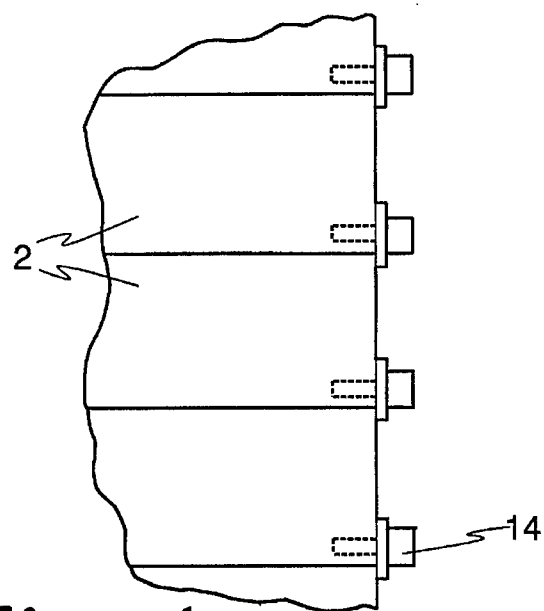
FIG. 4 is a fragmentary plan view of a shutter showing its associated guide members.
Figure 5:
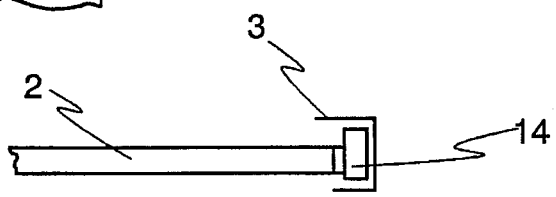
FIG. 5 is a fragmentary end view of a shutter showing how the guide members are received in a guide channel or track.

As shown in FIG. 1, webbing tapes 12 are fixed to the shutter 1 and in conventional fashion are wound around a spring-urged roller 13 mounted in the vehicle body at the top of the door opening to assist the raising and lowering of the shutter. As can be seen in FIGS. 4 and 5, guide members 15 are fixed to the ends of the lathes and are guided within the tracks 3 to support the shutter in position during use.

Figure 2:
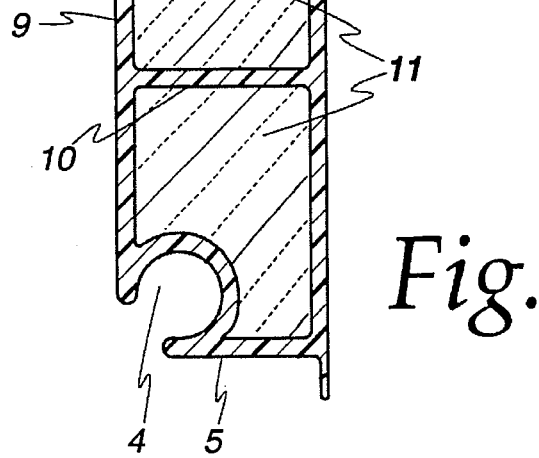
FIG. 2 is a cross-section through a shutter lathe.

In the present embodiment, the planks or lathes 2 are extruded from high impact UPVC (polyvinyl chloride) plastics to form the hollow or twin-walled section best seen in FIG. 2. In this embodiment, the lathes are generally rectangular in cross-section and have an opposed pair of face webs 9 united by opposite edge webs 5 and internal cross webs 10 which extend between the faces 9. If desired the cavities 11 defined by the hollow section can be filled with a thermally insulating material 16, e.g. foam plastics material (see FIG. 2).

The edges 5 of the lathe 2 are formed with oppositely disposed part-cylindrical key-hole slots 4 which extend along the edges 5 and are adapted to receive the correspondingly shaped part-cylindrical opposite edge portions 7 of an elastomeric member or strip 6 which forms a hinge uniting the planks or lathes. The elastomeric hinges comprise constant cross-section strips of rubber or the like elastomer having enlarged part-cylindrical opposite edge portions 7 joined by a web portion 8 to resemble a dumb-bell in cross-section.

Figure 3A:
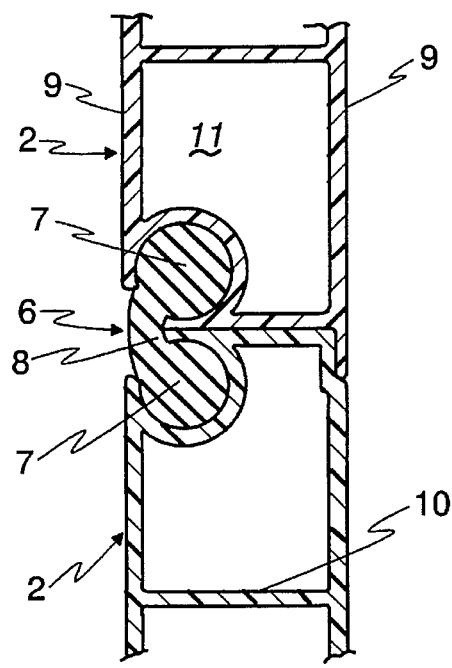
FIGS. 3a and 3b are fragmentary cross-sectional views of a pair of lathes of the kind shown in FIG. 2, and showing their manner of interconnection and articulation.
Figure 3B:
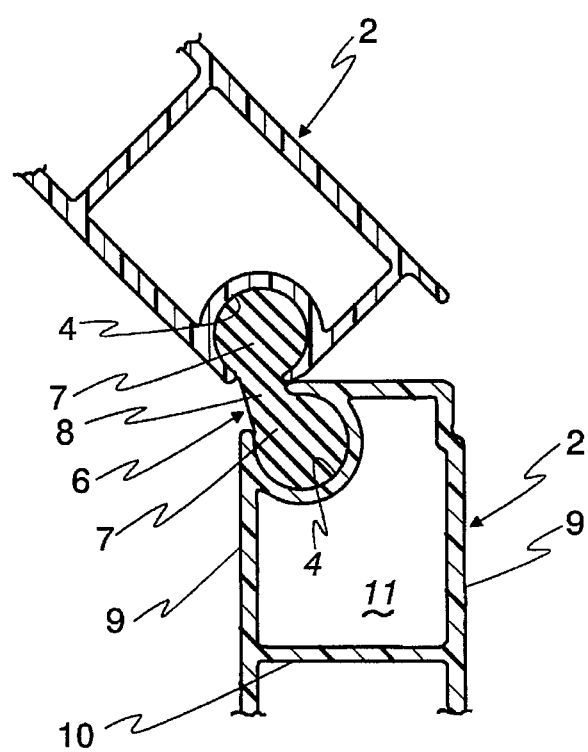

The hinge members 6 are engaged with the lathes 2 by sliding one lengthwise with respect to the other so that the enlarged portions 7 of the member 6 are engaged in the key-hole slots 4. The hinge members 6 and the lathes are preferably co-extensive. As shown in FIG. 3a the hinge members 6 may be slightly tensioned or stretched when the lathes 2 are in a planar relationship, such as when the shutter is closed, to improve the rigidity of the shutter.

Although as illustrated, the planks or lathes are of double wall or skin construction they could, of course, be of single wall. Equally they could be extruded from aluminium or fabricated from other materials. Also the cross-sectional shape of the elastomeric member 6 could be different from that shown.

Industrial Applicability

The specific embodiment thus provides a sliding door or shutter which is of light weight, of high strength, of good thermally insulating properties, which is economical to produce, and which requires little or no maintenance.

I claim:

1. A sliding shutter comprising:
   a plurality of abutting laths having opposite substantially planar faces and abutting longitudinal edges, each said lath having a slot of generally keyhole shape cross-section extending along each said longitudinal edge, and each keyhole slot opening from the lath at a junction between the longitudinal edge and a face of the lath; and an elongate flexible elastomeric hinge member of constant cross-section having an opposite pair of enlarged portions and a central flexible web portion connecting the opposite enlarged portions, one said enlarged portion being housed in the said keyhole slot in the edge of one said lath and the other said enlarged portion being housed in the said keyhole slot in the edge of an abutting lath for hingedly connecting the laths in an abutting relationship, the elastomeric hinge members being tensioned when the faces of the laths are co-planar by folding of the central web portion about the respective edges of the laths to pull said abutting edges of the laths together.

2. A shutter according to claim 1 wherein the elastomeric members are of constant cross-section and the opposite enlarged portions are joined by a web.

3. A shutter according to claim 2 wherein the elastomeric members are dumb-bell shaped in cross-section.

4. A shutter according to claim 1 wherein the laths have a predetermined length along their longitudinal edges and the elastomeric members extend along the entire edge length of the laths.

5. A shutter according to claim 1 wherein the laths are formed from a high impact plastic.

6. A shutter according to claim 1 wherein the laths have hollow interiors.

7. A shutter according to claim 6 wherein the hollow interior of the laths is filled with a thermally insulating material.

* * * * *